United States Patent [19]

Burgdorf

[11] Patent Number: 4,892,364
[45] Date of Patent: Jan. 9, 1990

[54] SYSTEM FOR THE OPERATION OF AN AUXILIARY PUMP

[75] Inventor: Jochen Burgdorf, Offenbach-Rumpenheim, Fed. Rep. of Germany

[73] Assignee: Alfred Teves GmbH, Frankfurt am Main, Fed. Rep. of Germany

[21] Appl. No.: 336,276

[22] Filed: Apr. 11, 1989

[30] Foreign Application Priority Data

Apr. 20, 1988 [DE] Fed. Rep. of Germany ....... 3813172

[51] Int. Cl.$^4$ .............................................. B60T 8/48
[52] U.S. Cl. .................................... 303/116; 303/111
[58] Field of Search ............... 303/110, 111, 113, 114, 303/115, 116, 119

[56] References Cited

U.S. PATENT DOCUMENTS 4,776,645  10/1988  Seibert et al. ...................... 303/113
4,790,608  12/1988  Burgdorf et al. ............... 303/116 X

FOREIGN PATENT DOCUMENTS 1324594  7/1973  United Kingdom ................ 303/116

Primary Examiner—Duane A. Reger
Attorney, Agent, or Firm—Robert P. Seitter

[57] ABSTRACT

A system for operating the auxiliary pumps (57, 58) of an anti-locking control system is provided. The movements of the working pistons (63, 64), the pressures prevailing in the pressure chambers (71, 72) of the tandem master cylinder (18) of the ALC-system and the speed of the driving motor (55) of the pump are sensed. These sensor signals and the volume requirement-indicating signals determined in accordance with control algorithms (volume patterns) as stored in the electronic controller (54), are processed in an electromotor controller (55) into output signals for the control of the motor. In this manner, the delivery volumes of the pump are varied. Through variation of the delivery volumes, a positioning of the brake pedal at least to its initial position thereof is achieved. Standard-type master cylinders comprising breather bore systems may be suitably employed.

15 Claims, 2 Drawing Sheets

SYSTEM FOR THE OPERATION OF AN AUXILIARY PUMP

The present invention relates to a system for the operation of an auxiliary pump in an electro-hydraulic control system for use with the brake pressure control system in hydraulic brake systems of automotive vehicles, and in particular, for anti-locking brake control systems (ALS). The brake control system of the type described herein comprises a master cylinder including at least one working piston and one working chamber. A pressure modulator comprising passage valves and blocking valves for the modulation of the hydraulic pressure in the wheel cylinders of the vehicle during the control mode, and at least one electronic controller processing wheel sensor signals to form regulating signals for the passage and blocking valves of the pressure modulator.

BACKGROUND OF THE INVENTION

Anti-locking brake control systems of this type are being increasingly employed in the automotive industry along with hydraulic pumps for generating an auxiliary pressure in the control mode to create special categories of these anti-locking brake control systems. An anti-locking brake control system of this special category is disclosed, for example, by German Patent Application P 37 31 603.6.

The afore-identified patent application describes a brake system, especially for use with automotive vehicles, comprising a master cylinder, wheel cylinders and an anti-locking brake control system. Additionally, that prior art application provides, in the control mode, means for positioning the piston of the master cylinder in a predetermined desired location. There also is a pressure fluid source, preferably a pump having a variable rate of delivery which, by means of a hydraulic conduit, is in communication with the master cylinder and which, through the pump rate of delivery, positions the piston in the predetermined location.

SUMMARY OF THE INVENTION

It is an object of the present invention to provide a device that permits a complete monitoring of the hydraulic pump thereby enhancing the safe way of operation of the entire brake pressure control means.

The brake pedal is to be positioned during the control mode in accordance with a predetermined algorithm. For example, during the control mode, the brake pedal which is known to be in operative communication with the push rod piston of the master cylinder shall be moved to a predetermined location at least equal to the initial position of the brake pedal.

The energy consumption, during the control mode, is to be reduced.

More importantly, in the practice of the invention, the tandem master cylinder is to be of a simple configuration. In lieu of a complex tandem master cylinder provided with controlling central valves in the working pistons, a standard-type tandem master cylinder having a simpler breather bore system of the conventional type is to be used.

The problems encountered by the prior art will be solved in the following manner: (1) the motions of the working piston are sensed and manifested in the form of electric signals generated by a motion or way sensor, (2) the required volume of the master cylinder is detected by the electronic controller according to a predetermined algorithm (volume pattern) installed therein and is made available in the form of electric signals at the output of the electronic controller (signals indicative of the required volume), and (3) that the way sensor signals and signals indicative of the volume requirement are processed in an electronic pump control device to determine the rate of delivery of the pump necessary to provide a predetermined quantity, so that the regulated quantity as determined by the predetermined algorithm is employed for controlling the rate of delivery of the pump.

According to another embodiment of the system as defined by the invention, provision is made so that the positions, directions of movement, speeds and/or accelerations of the working piston are sensed and manifested in the form of electric signals (way sensor signals, that way sensor signals and electronic controller signals indicative of the volume requirement as determined by the predetermined algorithm are processed to provide a regulated quantity for locating the working piston at a predetermined location.

A further embodiment provides means whereby the varying pressure in the working chamber of the master cylinder is sensed and manifested in the form of electric signals (pressure sensor signals), and the pressure sensor signals so generated are utilized for establishing a regulated quantity for the control of the delivery rate of the pump.

Still another embodiment of the instant system utilizes means whereby the varying speed of the driving motor of the auxiliary pump is sensed and manifested in the form of electric signals (speed sensor signals) and these speed sensor signals are compared with and adjusted relating to a predetermined norm for the control of the delivery rate of the pump.

By way of addition to or by way of alternative to the signals indicative of the volume requirement, the electric valve pulses utilized for the preparation of the blocking and passage valves of the pressure modulator, as determined by the electronic controller of the brake pressure control system, can be relied upon for controlling the regulated quantity passing to the working chamber of the master cylinder and to valves in the modulator as determined by the predetermined delivery rate of the pump.

In a still further embodiment of the system, according to the present invention, provision can be made for an individual independent control of the delivery rate of the pump as applied to both the working chamber of the push rod piston as well as the working chamber of the floating piston.

To carry out the system of the invention, the master cylinder is furnished with at least one way sensor for at least one working piston. In addition, at least one pressure sensor can be provided for at least one working chamber.

According to a preferred form of embodiment of the afore-mentioned systems, provision can be made for that the regulated quantity determined by the electronic pump controller is used for controlling the speed of the electrical driving motor for the pump.

For controlling the rate of delivery, by way of alternative or in addition to the control through the drive of the pump by electromotive force, provision can be made whereby the discharge side of the auxiliary pump, through a conduit, is in communication with the intake side by means of a by-pass valve element (pump by-pass valve), with the said by-pass valve element, preferably, being configured as an electromagnetically actuatable valve blocking in the resting position thereof and being switchable by electric signals.

By way of alternative, or in addition to, the afore-described means for determining regulated quantities by the electronic pump controller, the control of the speed of the electrical driving motor for the pump, can also be used for switching the pump valves.

Moreover, it is suggested that the predetermined quantity regulated by the algorithm can be used for timing the electric voltage of the driving motor and, hence, for controlling the speed and, hence, the output of the pump.

The regulated quantity as determined from an algorithm, by way of alternative or in addition, can be used for timing the pump valves and, hence, for controlling the rate of delivery.

For carrying out the afore-described systems, an electronic pump controller for varying the rate of delivery of the pump is suggested which, preferably, is in the form of an electromotor controller comprising, in particular, inputs from the controller to one or more of the following, namely, the way sensor signals, the pressure sensor signals, the valve pulses or signals indicative of the volume requirement, the speed sensor signals of the motor, and, an alternative output signal for the control of the motor speed or alternatively the switching on and off of the motor, and means at said output for monitoring the controller.

The electromotor controller along with the electronic controller of the brake pressure control system, in particular, the anti-locking control system, may be an integral unit.

BRIEF DESCRIPTION OF THE DRAWING

Further details of the invention will become manifest from the following description of one form of embodiment, wherein.

DETAILED DESCRIPTION

Figure 1:
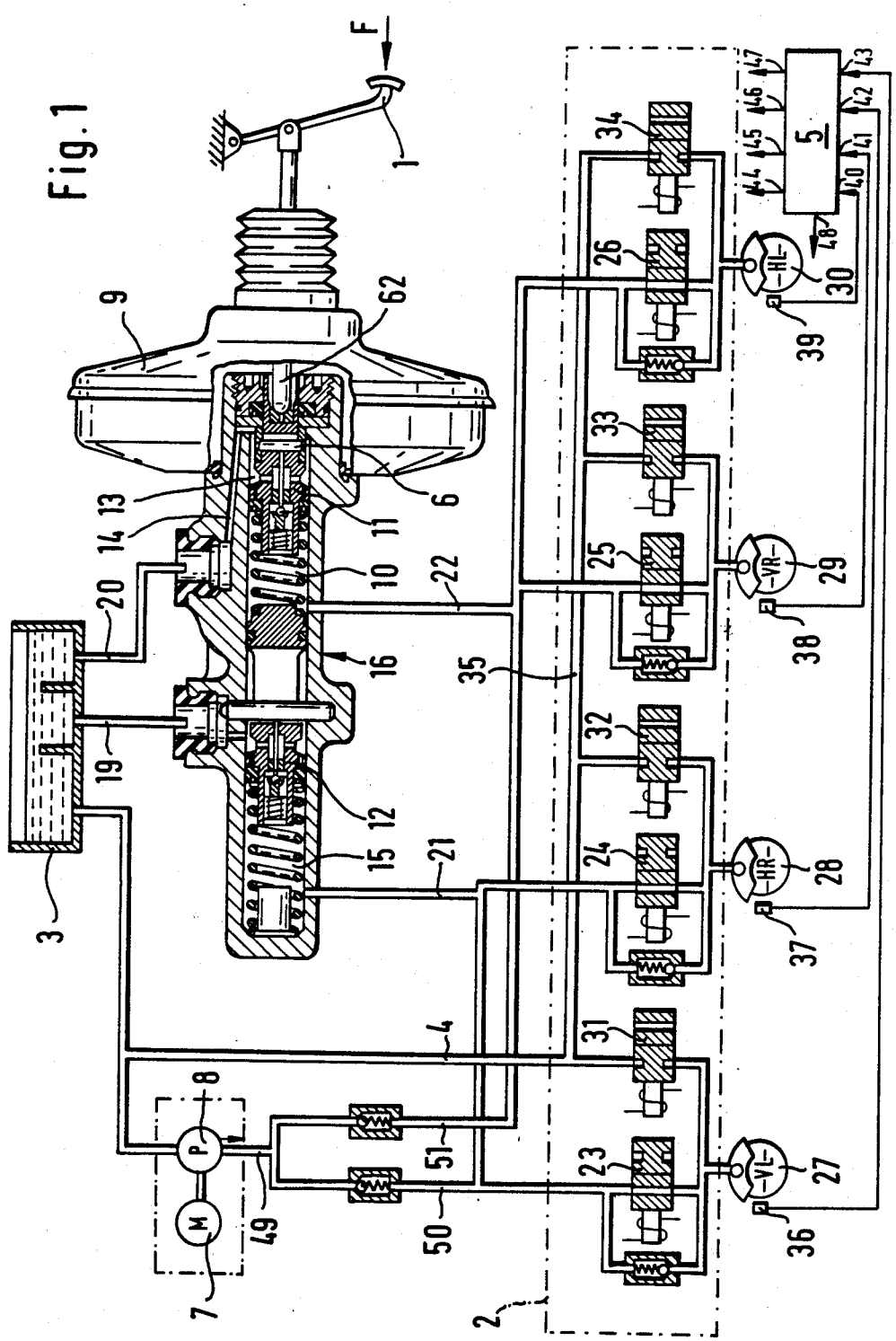
FIG. 1 shows an anti-locking control system in the prior art utilizing a vacuum brake force booster.

The prior art anti-locking brake control system, according to German Patent Application P 37 31 603.6, as shown generally in FIG. 1 comprises the following units: a vacuum brake force booster 9 actuated by a brake pedal 1; a tandem master cylinder 16; a modulator 2 for the pressure control in the anti-locking control mode; an electronic controller 5 for the processing of wheel sensor signals; and a hydraulic pressure pump 8 actuated by an electromotor 7.

FIG. 1 shows that system in the releasing position. Pressure chambers 10, 15 of the master cylinder are in communication with the pressure fluid reservoir 3, in known manner, through open central control valves and connecting channels in the interior of the pistons 11, 12, and through ring chambers 13 in the intermediate pistons and through ports and hydraulic conduits 19, 20.

The two pressure circuits 21, 22 of the master cylinder inlet valves 23, 24, 25. 26, are in communication with the wheel brakes 27, 28, 29, 30, respectively, through electromagnetically actuable are switched, in their basic position, to an open passage as shown. They are called SO-valves and are open in de-energized condition.

In this prior disclosed device, wheel brakes 27, 28 and 29, 30, respectively, are connected in parallel to pressure circuits (brake circuits) 21, 22 disposed in diagonal relationship. In respect of the arrangement of the wheels of the automotive vehicle corresponding to the afore-mentioned brakes, the following abbreviations were employed: VL referring to the front-sided left; HR referring to the rear-sided right; VR to the front-sided right and HL to the rear-sided left. Wheel brakes 27, 28, 29, 30, moreover, can be connected to the reservoir or to the pressure-compensating reservoir 3 through electromagnetically actuable output valves 31, 32, 33, 34 blocking in the basic position—so-called SG-valves closed in de-energized condition—through a hydraulic return flow conduit 35, and through conduit 4. The wheels of the automotive vehicle are furnished with inductive sensors 36, 37, 38, 39 cooperating with toothed discs engaged in synchronism with the wheel rotation and generating electric signals indicative of the wheel rotating pattern, i.e. of the wheel peripheral speed and the changes in that speed. These signals, through inputs 40, 41, 42, 43, are supplied to the electronic controller 5. The electronic controller 5 processes the sensor signals, in accordance with a control algorithm stored therein, to produce output signals (brake pressure control signals) by way of which, in the brake pressure control mode, the SO-valves and the SG-valves are switched thereby decreasing, keeping constant or re-increasing the brake pressures in the individual wheel cylinders of the disc brakes in accordance with the control algorithm. For this purpose, the actuating magnets of the SO-valves and SG-valves are excited through outputs 44, 45, 46, 47 of the electronic controller. The electrical connecting circuits between outputs 44, 45, 46, 47 and the windings of solenoids actuating the SO-valves and SG-valves are shown schematically in the drawing. In the brake pressure control mode, the electromotor 7 of the pump 8 is actuated. The switch-on signal is provided to the motor by output 48 of the electronic controller 5. The pump 8, in the control mode of modulator 2, builds up pressure in the pressure conduits 49, 50, 51. These conduits are pressurized fluid-carrying and are in communication with the pressurized fluid-carrying lines of the tandem master cylinder 16, in the form of pressure conduits 21, 22. In the control mode, the pressure chambers 10, 15 of the tandem master cylinder 16 are pressurized by the pump 8.

When applying the brake in the normal brake mode, pedal force F, supported by the vacuum in booster 9, is transmitted to the master cylinder pistons 11, 12. The central control valves in these pistons will close such that brake pressure can now build up in the pressure chambers 10, 15 and, hence, in the brake circuits 21, 22, which brake pressure, through SO-valves 23, 24, 25, 26 is fed to the wheel brake cylinders. Once a locking tendency is detected in one or more of the wheels, with the aid of sensors 36, 37, 38 39 and the electronic controller 5, the anti-locking control mode of modulator 2 will commence to operate. The driving motor 7 of the pump 8 is switched on thereby building up pressure in the pressure conduits 49, 50, 51 which, on the one hand, through the SO-valves, acts upon the wheel cylinders of the wheel brakes and, on the other hand, applies pressure to the pressure chambers 10, 15 of the master cylinder 16, as shown in FIG. 1.

In this prior embodiment, the control algorithm provides additional signals by the electronic controller 5 that result in the switch-over of the electromagnetically actuable SD- and SG-valves.

As a result of the pump pressure in the working chambers 10 and 15, the working pistons 11 and 12, in FIG. 1, are displaced to the right. The push rod piston 11, in this prior art brake force booster, moves to its righthand stop 6 (FIG. 1), thereby restoring the brake pedal 1 to take its initial position. Accordingly, the driver's foot is applied to a restored pedal. In that position, the co-axial central valves of the push rod piston 11 and of the intermediate piston 12 are shown in FIG. 1 as being open. Pressure fluid can flow back, through the said central valves, in known per se manner, via return flow conduits 19 and 20, into reservoir 3.

In the intermediate piston 12, this is done through the non-pressurized ring chamber, not numbered, of the said intermediate piston, whereas in the push rod piston 11, this is done through the non-pressurized intake chamber 13 and the intake port 14 into the return flow conduit 20. During the entire control mode, the working pistons are held in the initial position. Similarly, the brake pedal 1, during the entire control mode, is held in its initial position.

The prior German Patent Application P 37 31 603.6 mentioned above, shows a sensing operation of the push rod piston or of the sheet-metal piston of the vacuum brake force booster. Depending on the actual position of the working piston, that state-of-the-art pump delivers predetermined volumes into the working chamber of the master cylinder to place the said working piston into its nominal position. This is intended to position also the brake pedal operatively connected to the working piston prior to its normal initial position, during the control mode.

Figure 2:
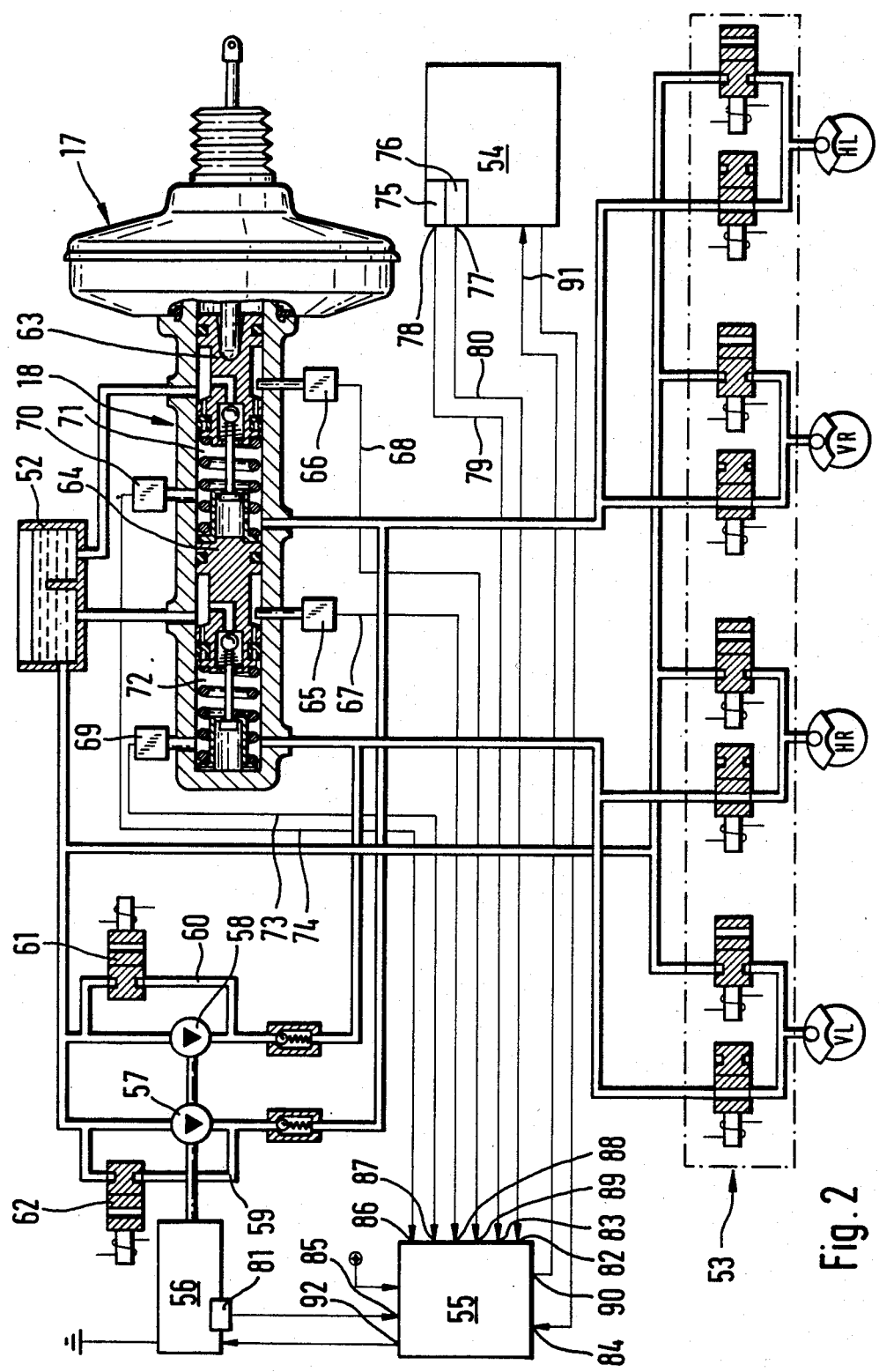
FIG. 2 shows one form of a preferred embodiment of the present invention which is an improved system of the type generally shown in FIG. 1.

Referring to FIG. 2 which shows the improved system of the present invention wherein a vacuum brake force booster 17 acts upon a tandem master cylinder 18. The tandem master cylinder, according to the standard construction, is furnished with a co-axial central breather bore system.

Numeral 52 designates the unpressurized reservoir for the pressure fluid, while numeral 53 designates the entirety of the pressure modulator of the anti-locking control system as described in closer detail with reference to FIG. 1.

Numeral 54 refers to the electronic controller of the anti-locking control system modulator 53. The present form of embodiment, in addition, exhibits an electromotor controller 55.

According to FIG. 2, an electrical driving motor 56 is provided for the two pumps 57, 58. The discharge sides of the pumps, through conduits 59, 60, are in communication with the intake sides thereof. Provided in the said conduits are by-pass pump valves 61, 62 that are electromagnetically actuatable. These valves are shown closed in their de-energized condition.

The tandem master cylinder 17 includes a push rod piston 63 and a floating piston 64. The motions of the two working pistons are recorded by the way or motion sensors 65, 66 and impulses from way sensors 65, 66 are transmitted, through electrical circuits 67, 68, respectively, to the electromotor controller 55. Moreover, pressure sensors 69, 70 may be provided for determining the pressure prevailing in the working chambers 71, 72. The pressure sensors 69, 70 transform the hydraulic pressure into electric signals which, through circuits 73, 74, are also transmitted to the electromotor controller 55.

Control algorithms 75, 76 define predetermined volume patterns which at the output terminals 77, 78 of the electronic controller 54, signals are made available which, through electrical circuits 79, 80, are transmitted to the electromotor controller 55. With the aid of these volume patterns, the volume requirement for the working chambers 71, 72 of the tandem master cylinder 18 will be calculated by controller 55. The delivery volumes of the pumps 57, 58 are designed so as to affect a randomized nominal position of the working push rod piston 63 and, hence, of the brake pedal (not shown) during the anti-locking control mode.

Alternatively, the valve pulses for the SO- and SG-valves of the pressure modulator rather than the volume requirement-indicating signals can be supplied, through conduits 79, 80, to the electromotor controller.

The electromotor 56 as shown in FIG. 2 is provided with a sensor 81 for sensing the velocity and acceleration speed of the motor 56.

Numerals 82 and 83 refer to inputs into electromotor controller 55 of the volume requirement-indicating signals defined by the two volume patterns generated by algorithms 75, 76 or for the valve pulses of the SO- and SG-valves generated by the pressure modulator 53. Numeral 84 refers to the input terminal for the signal to switch on and off the motor 56. Numeral 85 designates the input terminal for the signal of the speed sensor 81 of the electromotor 56.

Numerals 86, 87 refer to the inputs for the signals of the pressure sensors 69, 70 while numerals 88, 89 refer to the inputs for the signals generated by the motion or way sensors 65, 66.

Numeral 90 designates an output for a signal for monitoring the controller 55. That signal, through circuit 91, is transmitted to the electronic controller 54 of the anti-locking control system.

It is one of the functions of the electromotor controller 55 to switch on and off the motor 56 through a relay, and to control the electromotor 56 and, hence, the delivery volumes of the pumps 57, 58, respectively, for attaining the nominal position of the working pistons 63, 64 of the master cylinder 18 and of the brake pedal (not shown) to the right of the initial position thereof as viewed in the drawing. Pump function, motor speed, pressure in the working chambers and supply of an adequate pressure fluid reserve for the master cylinder are thus all monitored.

The electromotor control 55, in the broadest sense of the work, serves to increase the operating comfort of the brake pedal (not shown) and to fix, in addition to the positioning as such, also the speed of positioning of the brake pedal. Finally, the electromotor control enables substantial noise attenuation to be achieved.

The way of operation of the system according to FIG. 2 is as follows:

Based on the volume patterns defined by control algorithms 75, 76 for the push rod piston 63 and the floating piston 64 as stored in the electronic controller 54, during the control mode, signals indicating the volume requirement are generated on the outputs 77, 78. The volume requirement indicating signals 75, 76 along with the motion or way sensor signals 65, 66 and the pressure sensor signals 69, 70 as well as the speed sensor signals 81 are processed in the electromotor controller 55 into regulated signals on the output 92 for the electromotor 56, thereby varying the delivery volumes of the pumps 57, 58. By varying the delivery volumes of pumps 57, 58, the desired positioning and the positioning speed of the working pistons 63, 64, in particular, of the push rod piston 63, and, hence, of the brake pedal (not shown) will be attained.

An alternative method, in addition to the control through the electromotor 56 set forth above, involves by-pass pump valves 61, 62, the opening and closing of which can be timed in accordance with the control algorithms 75, 76 stored in the electronic controller 54, thereby varying the delivery performance of the pumps 57, 58.

In lieu of a single motor driving two pumps, two electromotors (not shown) can be used, each connected to just one pump, with each the individual electromotors being independently controlled. Another alternative resides in an electromotor which actuates a dual-circuit pump (not shown), with the volume of delivery of the dual-circuit pump being controlled through an electromagnetic valve (not shown). Another variant resides in the combination of an electromotor a dual-circuit pump (not shown) that has two electromagnetic valves for controlling the volumes of delivery.

Any type of controllable electromotor may be utilized in the various embodiments setforth herein, and any innovation found in any one embodiment can be utilized in other embodiments.

The afore-described system of the present invention enables a precise effective pedal positioning during the control mode and a total pump monitoring to be attained. The delivery amounts for the two actuating circuits of the brake system can be controlled individually. The pedal feeling is improved; the energy consumption reduced. The tandem master cylinder employed can be a standard-type master cylinder comprising a breather bore system.

What is claimed is:

1. A system of operating an auxiliary pump of an electro-hydraulic control system for hydraulic brake systems and particularly of automotive vehicles brake pressure control means, in particular, an anti-locking brake control system (ALC-system), including a master cylinder exhibiting at least one working piston and one working chamber, preferably at least one pressure modulator having at least one passage valve and blocking valve, for the modulation of the hydraulic pressure in the individual wheel cylinders during the control mode, at least one electronic pump controller adapted to accept signals from at least one wheel sensor means, said controller adapted to form regulated signals for operation of said at least one passage and blocking valves of said at least one pressure modulator, motion sensor means being provided so that the motions of said working piston are sensed and manifested in the form of electric way sensor signals, at least one algorithm means connected with said at least one electronic controller whereby the volume requirements of said master cylinder are determined by said at least one electronic controller in accordance with said algorithm means installed therein which defines volume patterns that are made available at the output of said electronic controller in the form of volume requirement-indicating electric signals, in that said way sensor signals and said volume requirement-signals in said electronic pump controller are processed to form a predetermined regulated quantity and said regulated quantity is employed for controlling the rate of delivery of said auxiliary pump.

2. A system as defined in claim 1, wherein the positions, directions of movements, speeds and/or accelerations of the working piston are sensed by said motion sensor means and manifested in the form of said electric way sensor signals, that said way sensor signals and volume requirement-indicating signals are processed into a regulated quantity.

3. A system as defined in claim 2, including pressure sensor means communicating with said at least one working chamber and the varying pressure in said at least one working chamber of said master cylinder is sensed and manifested in the form of electric pressure sensor signals, that said pressure sensor signals being used to define said predetermined regulated quantity in said working chamber which is employed as a factor in controlling the rate of delivery of the pump.

4. A system as defined in claim 1, wherein said system includes speed sensor means for sensing the varying speed of the driving motor of the auxiliary pump, said speed sensor developing electric signals and said speed sensor signals are processed to define said regulated quantity as a factor in the control of the rate of delivery of said auxiliary pump.

5. A system according to claim 1, wherein the valve pulses for said at least one blocking and passage valves are used by said at least one electronic pump controller in processing said regulated quantity for controlling said rate of delivery of said auxiliary pump.

6. A system according to claim 1, wherein master cylinder includes two working chambers, and one push rod piston and one floating piston, individual controls of the delivery volume of said pump are utilized for each of said working chamber of said push rod piston and the working chamber of said floating piston.

7. A system according to claim 1, wherein said master cylinder (18) is furnished with at least one said motion sensor (65, 66) for at least one said working piston (63, 64).

8. A system as defined in claim 1, wherein said master cylinder (18) is provided with at least one pressure sensor (69, 70) for at least one said working chamber (71, 72).

9. A system as defined in claim 1, wherein said regulated quantity is used for controlling the speed of the electrical driving motor for said pump.

10. A device according to the system set forth in claim 1, wherein the discharge side of said auxiliary pump (57, 58), through a conduit (59, 60), is in communication with the intake side of said pump, which conduit includes a by-pass valve element (61, 62), with the said by-pass valve element, preferably, being in the form of an electromagnetically actuable valve blocking said conduit (59, 60) in the resting position thereof and being switchable to an open pass through mode by means of electric signals.

11. A device as defined in claim 10, wherein said regulated quantity is used as one factor in controlling the switching the pump valves.

12. A device according to claim 10, wherein said predetermined regulated quantity is used as a factor for timing the electric voltage of the driving motor and, hence, for controlling the speed.

13. A device as defined in claim 10, wherein said regulated quantity is used for timing said by-pass pump valves and, hence, for controlling the delivery rate.

14. A device as defined in claim 1, wherein said electrical pump controller (55) is provided for controlling the rate of delivery of said pump (57, 58), which, preferably, is in the form of an electromotor controller which includes, in particular, inputs (88, 89, 86, 87, 82, 83, 85) for at least input of the following class of signals namely; the motion sensor signals, pressure sensor signals, valve pulses and volume requirement-indicating signals, speed sensor signals, and an output (92) for controlling the motor speed or the on- and off-switching of the motor (56), and an output (90) for monitoring the pump controller.

15. A device as defined in claim 14, wherein said electromotor controller is integrated in said electronic controller of the brake pressure control system.

* * * * *